US012014316B2

(12) United States Patent
Ma et al.

(10) Patent No.: US 12,014,316 B2
(45) Date of Patent: Jun. 18, 2024

(54) AUTOMATICALLY PLANNING DELIVERY ROUTES USING CLUSTERING

(71) Applicant: Walmart Apollo, LLC, Bentonville, AR (US)

(72) Inventors: Chenxin Ma, Belmont, CA (US); Mingang Fu, Palo Alto, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 554 days.

(21) Appl. No.: 16/778,659

(22) Filed: Jan. 31, 2020

(65) Prior Publication Data

US 2021/0241227 A1 Aug. 5, 2021

(51) Int. Cl.

| | |
|---|---|
| ***G06Q 10/0835*** | (2023.01) |
| ***G06F 16/22*** | (2019.01) |
| ***G06F 16/28*** | (2019.01) |
| ***G06F 16/906*** | (2019.01) |
| ***G06Q 10/047*** | (2023.01) |
| ***G06Q 10/0631*** | (2023.01) |

(52) U.S. Cl.

CPC ... *G06Q 10/08355* (2013.01); *G06F 16/2237* (2019.01); *G06F 16/285* (2019.01); *G06F 16/906* (2019.01); *G06Q 10/047* (2013.01); *G06Q 10/06312* (2013.01)

(58) Field of Classification Search

CPC .. G06F 16/2237; G06F 16/285; G06F 16/906; G06Q 10/047; G06Q 10/06312

See application file for complete search history.

(56) References Cited

U.S. PATENT DOCUMENTS 9,569,745 B1 * 2/2017 Ananthanarayanan ...................... G01C 21/343
10,152,685 B1 12/2018 Ananthanarayanan et al.

(Continued)

OTHER PUBLICATIONS

Pureza et al., Vehicle Routing with Multiple Deliverymen: Modeling and Heuristic Approaches for the VRPTW, European Journal of Operational Research, vol. 218, Issue 3, 2012, pp. 636-647, Retrieved from <https://www.sciencedirect.com/science/article/pii/S0377221711010605>, Retrieved on Jan. 11, 2024 (Year: 2012).*

(Continued)

*Primary Examiner* — Michael P Harrington
*Assistant Examiner* — Tayar M Kyu
(74) *Attorney, Agent, or Firm* — BRYAN CAVE LEIGHTON PAISNER LLP

(57) ABSTRACT

A method including planning delivery routes using clustering. The method can include generating clusters for nodes for order data based, at least in part, on (a) location information of the nodes and (b) load capacity information of delivery vehicles. The method also can include determining a respective centroid for each of the clusters. Further, the method can include computing a node-cluster distance matrix. Additionally, the method can include reassigning the nodes to the clusters based, at least in part, on: (a) the node-cluster distance matrix; (b) load capacity information of dispatched vehicles of the delivery vehicles; and (c) a predetermined average load threshold of the dispatched vehicles. Moreover, the method can include further reassigning, in at least 2 passes, the nodes to the clusters based, at least in part, on the time window information of the nodes. Other embodiments are disclosed.

20 Claims, 9 Drawing Sheets

(56) References Cited

U.S. PATENT DOCUMENTS

| | | | | |
|---|---|---|---|---|
| 2007/0282618 | A1 | 12/2007 | Barahona et al. | |
| 2013/0159206 | A1* | 6/2013 | Barahona | G06Q 50/28 705/338 |
| 2019/0020578 | A1* | 1/2019 | Beckmann | H04L 45/14 |
| 2019/0212753 | A1* | 7/2019 | Sarkar | G06Q 10/047 |
| 2020/0402004 | A1* | 12/2020 | Demizu | G06Q 10/047 |

OTHER PUBLICATIONS

Chiarandini, "Lecture 31, Construction Heuristics and Local Search Methods for VRP/VRPTW" [online], 2010 [retrieved on Apr. 19, 2020]. Retrieved from the Internet <URL: https://imada.sdu.dk/~marco/Teaching/Fall2010/DM204/Slides/dm204-lec31.pdf>.

* cited by examiner

Figure 4:
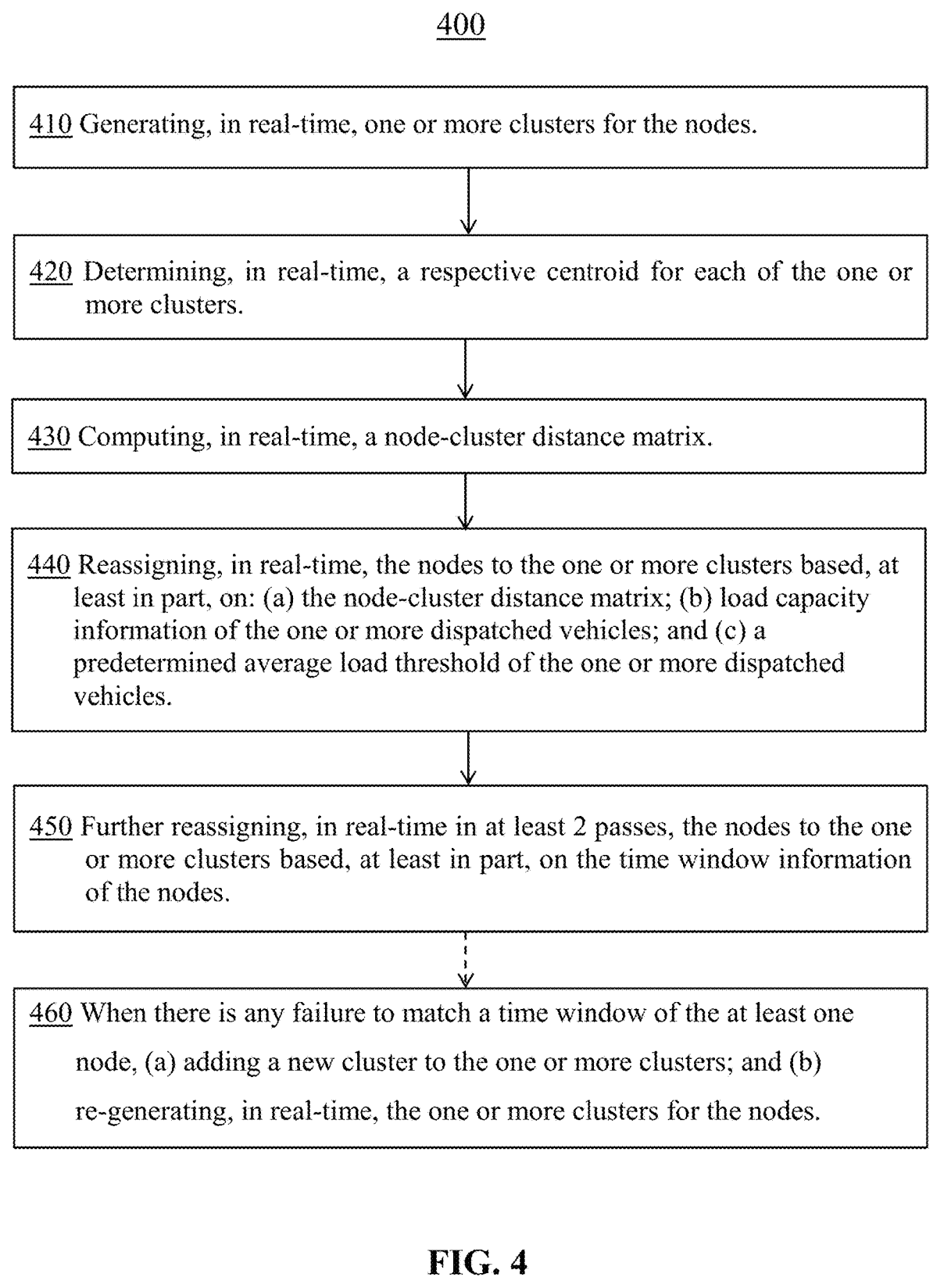

400

410 Generating, in real-time, one or more clusters for the nodes.

420 Determining, in real-time, a respective centroid for each of the one or more clusters.

430 Computing, in real-time, a node-cluster distance matrix.

440 Reassigning, in real-time, the nodes to the one or more clusters based, at least in part, on: (a) the node-cluster distance matrix; (b) load capacity information of the one or more dispatched vehicles; and (c) a predetermined average load threshold of the one or more dispatched vehicles.

450 Further reassigning, in real-time in at least 2 passes, the nodes to the one or more clusters based, at least in part, on the time window information of the nodes.

460 When there is any failure to match a time window of the at least one node, (a) adding a new cluster to the one or more clusters; and (b) re-generating, in real-time, the one or more clusters for the nodes.

610 Determining a respective delivery route for each of the one or more clusters for the nodes.

630 Optimizing a respective first node delivery route for each of the one or more first nodes in each of the one or more clusters.

640 Optimizing a respective remaining node delivery route for each of one or more remaining nodes in each of the one or more clusters.

700

720

AUTOMATICALLY PLANNING DELIVERY ROUTES USING CLUSTERING

TECHNICAL FIELD

This disclosure relates generally to automatically planning delivery routes using clustering.

BACKGROUND

Delivery route planning of hundreds or thousands of orders can be a time consuming task. Conventional systems generally assume that all the delivery requests are equal and any constraints in the real-world have to be observed and handled by the staff of the distributor or retailer in a timely manner. The latest trend for online order delivery has evolved into same-day deliveries or 2-hour deliveries. Systems and methods for automatically planning delivery routes that do not violate the observed constraints, such as pickup time, delivery time, load capacity of delivery vehicles, etc., are desired.

BRIEF DESCRIPTION OF THE DRAWINGS

To facilitate further description of the embodiments, the following drawings are provided in which:

FIG. 4 illustrates a flow chart for a method of optimizing deliver routes by clustering, according to an embodiment;

Figure 1:
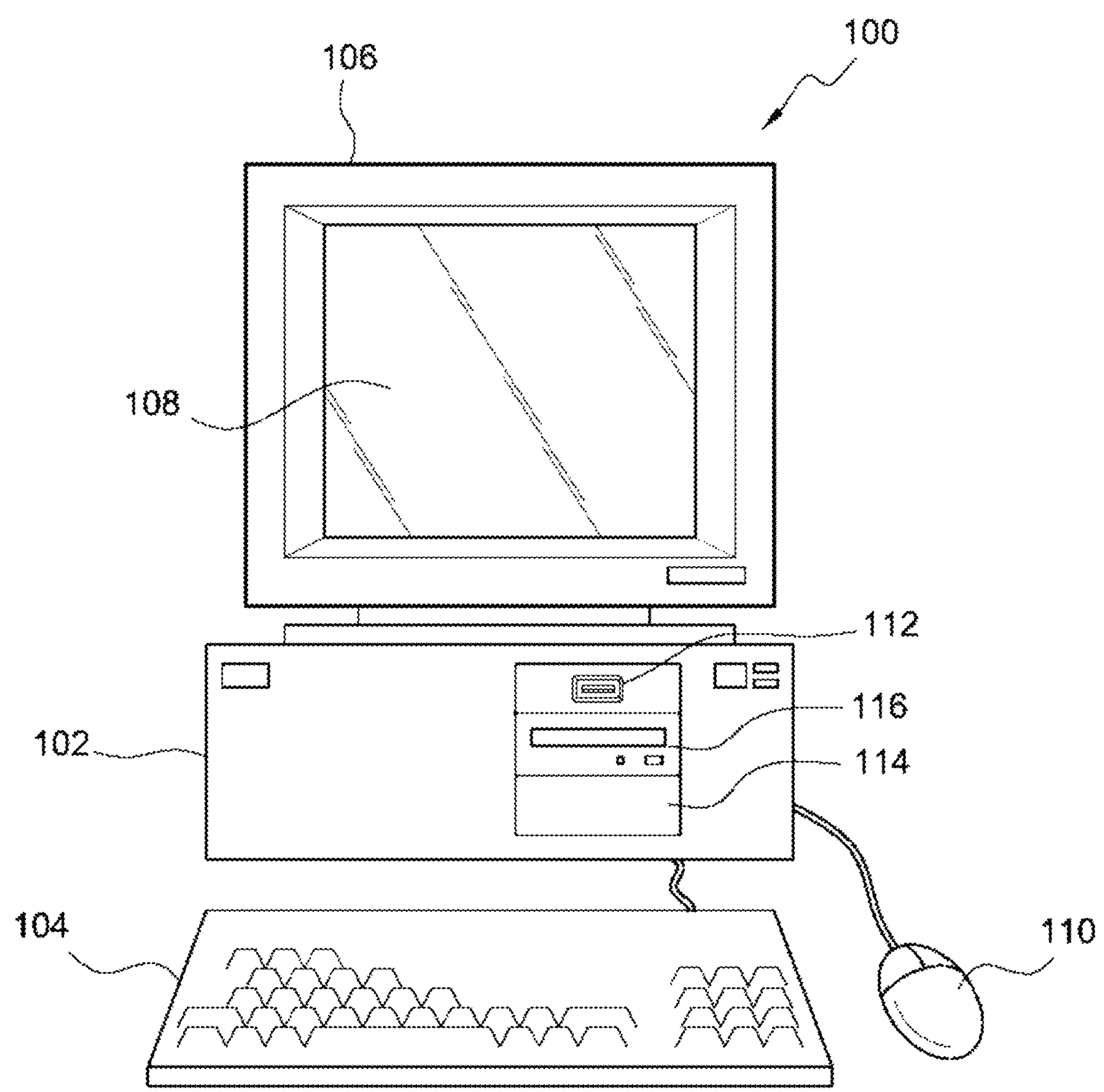
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order.

It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, or a minute.

DESCRIPTION OF EXAMPLES OF EMBODIMENTS

Figure 2:
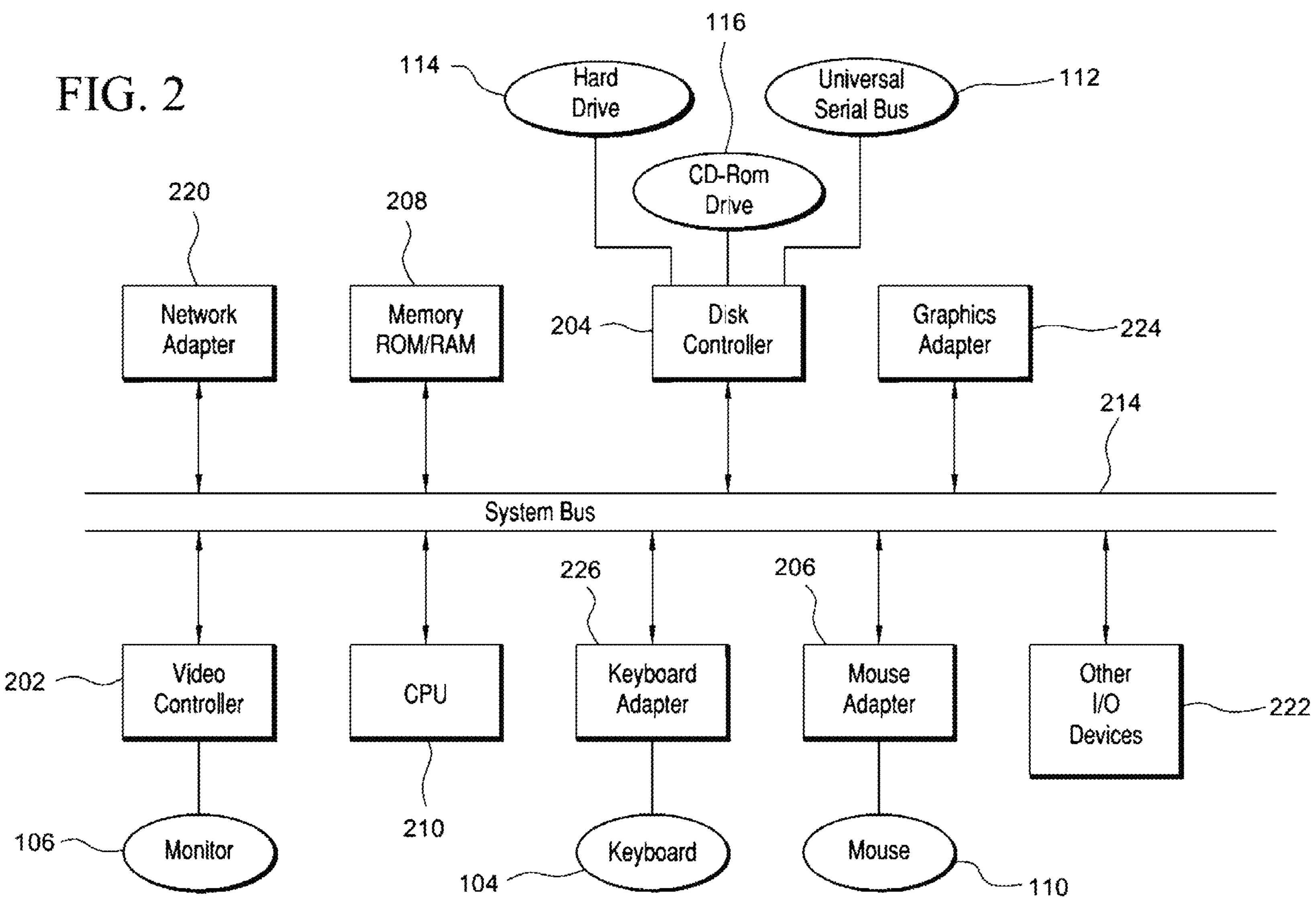
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
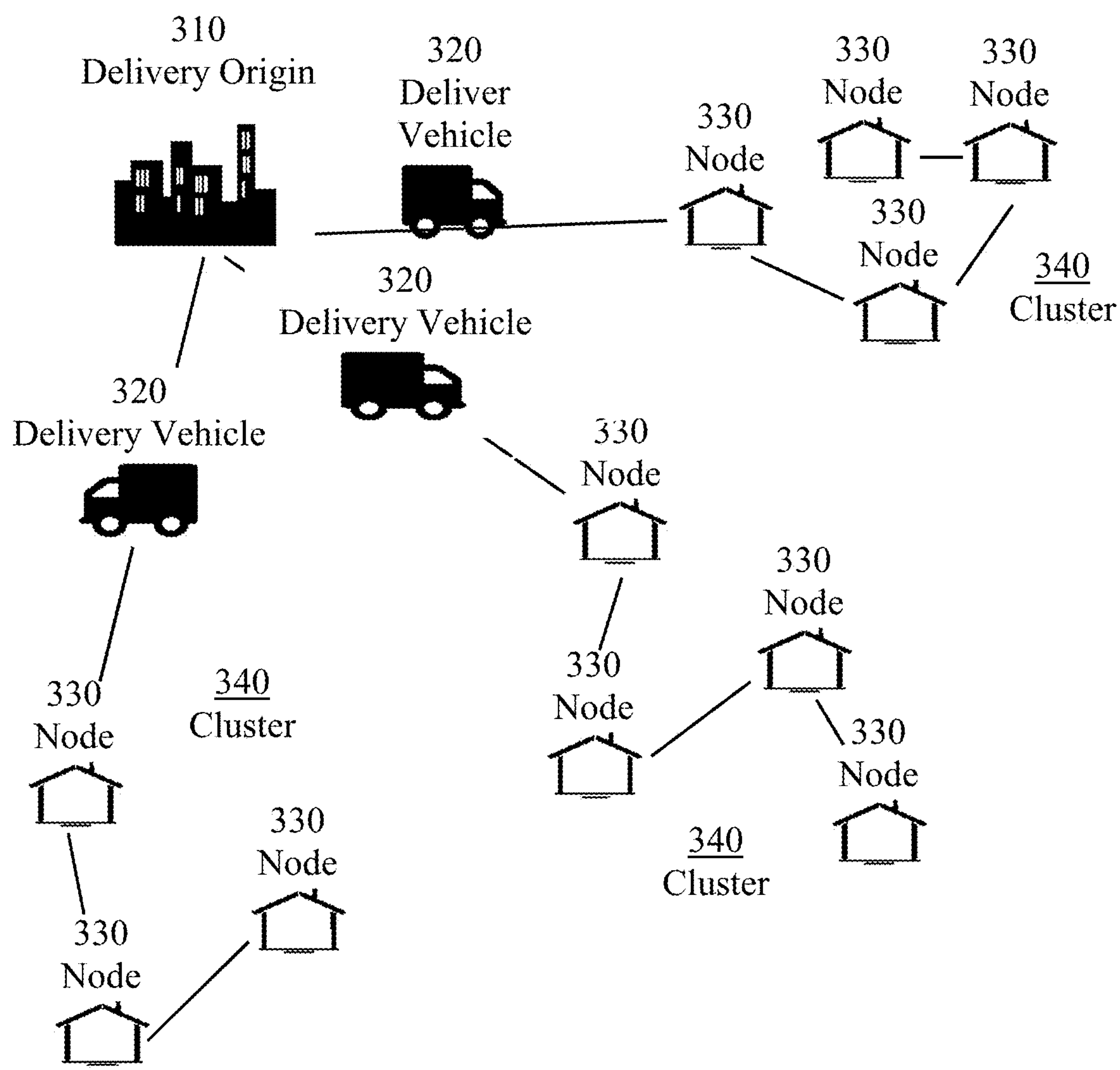
FIG. 3 illustrates an exemplary delivery network for which a method of optimizing deliver routes by clustering can be implemented, according to an embodiment.

Turning ahead in the drawings, FIG. 3 illustrates an exemplary delivery network 300 for which a method of optimizing deliver routes by clustering can be implemented, according to an embodiment. Delivery network 300 is merely exemplary, and the method is not limited to the embodiments presented herein. In many embodiments, computer system 100 (FIG. 1) can be suitable to perform the method of optimizing deliver routes by clustering for delivery network 300.

Referring to FIG. 3, delivery network 300 can include a delivery origin 310 (e.g., a warehouse, a distribution center, or a mortar and brick store), one or more delivery vehicles 320, and nodes 330 (e.g., delivery destinations for online orders). In some embodiments, delivery origin 310 is only a single delivery origin. In this delivery network 300, the method can divide the nodes 330 into one or more clusters 340 based on the locations of the nodes 330, and can assign each of the one or more delivery vehicles 320 to a single delivery route to deliver packages to geographically close nodes 330 assigned in a single cluster of the one or more clusters 340. In many embodiments, the one or more clusters 340 each can include a non-overlapping geographic area in which nodes 330 assigned to the cluster are located.

In some embodiments, the delivery routes for the delivery vehicles 320 can be subject to time constraints, such as the pick-up windows of the delivery origin 310, the working hours of the drivers of the delivery vehicles 320, and/or the designated delivery time by the purchaser or recipient associated with a node. In a number of embodiments, the delivery routes can be subject to a load capacity constraint (e.g., 30, 50, or 60 packages for a delivery vehicle), which can be the same for all of the delivery vehicles 320 or can be different for some of the delivery vehicles 320.

In a number of embodiments, the method can accommodate the time constraint(s) and/or the load capacity constraint and plan the delivery routes accordingly. In some embodiments, the method can determine the delivery routes and clusters 340 for hundreds or thousands of online orders in less than a time period between the cutoff time for delivery and the time when the preparation for the next delivery starts, which can be less than 10 or 30 minutes. In certain embodiments, the method also can balance the load for each delivery vehicle 320 by prioritizing any beneficial switching or moving of nodes to other clusters within clusters 340. In several embodiments, the method further can include transmitting the delivery routes as planned to be displayed on the displays of the delivery vehicles 320 or user devices of the drivers of the delivery vehicles 320.

Turning ahead in the drawings, FIG. 4 illustrates a flow chart for a method of optimizing deliver routes by clustering, according to an embodiment. In some embodiments, method 400 can be a method of automatically determining delivery routes, including grouping geographically close nodes into clusters. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, computer system 100 (FIG. 1) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 100 (FIG. 1). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 410 of generating, in real-time, one or more clusters for nodes (e.g., 330 (FIG. 3)) extracted from order data. In many embodiments, the order data can be associated to orders accepted by a retailer or a distributor before a cutoff time, and the order data can include hundreds or thousands of orders to be delivered per day. In some embodiments, block 410 can include extracting information for an order from the order data to a node representing the order. In a number of embodiments, the information extracted in block 410 for a node can include location information, time window information, sender and/or recipient information, package information, etc. In certain embodiments, block 410 further can include extracting load capacity information (e.g., maximum dimensions and/or weight for each package and/or for all the packages) of delivery vehicles (e.g., 320 (FIG. 3)). In several embodiments, some or all of the aforementioned information can be provided to block 410 as input data. In various embodiments, extracting the information can occur before block 410.

After obtaining the information from the order data, block 410 can include generating, in real-time, one or more clusters (e.g., 340 (FIG. 3)) for the nodes (e.g., 330 (FIG. 3)) based, at least in part, on (a) the location information of the nodes and (b) the load capacity information. In some embodiments, each of the one or more clusters is associated with a single respective vehicle of one or more dispatched vehicles of the delivery vehicles in the fleet. As an example, in an embodiment where there are 40 delivery vehicles and where each of the delivery vehicles has a capacity of 80 deliveries but has only an average of 60 actual deliveries and where the number of orders to be delivered currently is 3,000, block 410 can start with generating 40 clusters (i.e., one for each delivery vehicle) by dividing the geographic area for all the nodes into 40 subdivisions where each subdivision include the locations of 75 nodes (i.e., deliveries), for a total of 3,000 deliveries. In another example for a similar embodiment, block 410 can start with generating the 40 clusters by dividing the geographic area into 40 subdivisions of a substantially equal size. In other embodiments, the geographic area can be divided into a different number of subdivisions to accommodate the 3,000 deliveries by the 40 delivery vehicles.

In many embodiments, block 410 further can combine two or more nodes into one node that have the same destination but are somehow assigned to different clusters or assigned to different slots in an identical delivery route. In a different embodiment, the merging can occur after block 410.

Method 400 further can include a block 420 of determining, in real-time, a respective centroid for each of the one or more clusters. In a number of embodiments, block 420 can determine the centroid of the cluster as the geographic center of the cluster. In some embodiments, block 420 can determine the centroid of a cluster by calculating an average geographic coordinate of the nodes assigned to the cluster in block 410.

Method 400 also can include a block 430 of computing, in real-time, a node-cluster distance matrix. The node-cluster distance matrix can comprise a respective node-cluster distance between each of the nodes in each of the one or more clusters based, at least in part, on a respective distance between each of the respective nodes and the respective centroid for each of the one or more clusters. In some embodiments, block 430 can include calculating the respective node-cluster distance based on a street distance between each of the respective nodes and the respective centroid for each of the one or more clusters on a map.

Method 400 additionally can include a block 440 of reassigning, in real-time, the nodes to the one or more clusters based, at least in part, on: (a) the node-cluster distance matrix; (b) load capacity information of the one or more dispatched vehicles; and (c) a predetermined average load threshold of the one or more dispatched vehicles. In many embodiments, block 440 can accommodate a respective load capacity constraint for each dispatched delivery vehicle and further can balance the respective load of each dispatched delivery vehicle. As an example, the predetermined average load threshold can be a percentage, such as seventy percent (70%) or eighty percent (80%), of a maximum load of the load capacity information of the vehicle dispatched to a cluster. Block 440 can re-arrange the delivery routes by moving one or more nodes in a cluster to one or more other clusters when the load assigned to the delivery vehicle dispatched to the cluster exceeds the load capacity of the delivery vehicle. Block 440 also can move one or more nodes from a cluster to another cluster when the load assigned to the delivery vehicle exceeds the predetermined average load threshold.

Method 400 further can include a block 450 of further reassigning, in real-time in at least 2 passes, the nodes to the one or more clusters (e.g., re-clustering) based, at least in part, on the time window information of the nodes. In many embodiments, some nodes can comprise a time window request while other nodes comprise no time window requirements, and block 450 can prioritize the re-clustering process based on the time window for each of the nodes. For example, some of the senders and/or recipients may request that the package(s) be delivered at a time window, such as 9-11 am or 2-3 pm of a specific day or during several days. Moreover, block 450 can address the time constraint(s) as to the delivery origin (e.g., 310 (FIG. 3)), the delivery vehicles, and/or the drivers thereof. For instance, the delivery origin can have pick-up windows from 8-9 am, 11 am-1 pm, etc., the laws can require periodic breaks per day for the drivers, and union workers can have specific working hour requirements, and so forth. In some embodiments, the nodes can have more than one type of time windows, such as a soft time window requirement and a hard time window requirement, as well as the nodes with no time window. In these and other embodiments, block 450 can re-cluster the nodes in more than 2 passes. In some embodiments, block 450 can tally the number of infeasible nodes (e.g., an infeasible order count) of the nodes that block 450 fails to find a respective slot for each of the infeasible nodes in any delivery route that can satisfy the respective time window requirement.

Moreover, method 400 optionally can include a block 460 of (a) adding a new cluster to the one or more clusters and/or (b) re-generating, in real-time, the one or more clusters for the nodes, when there is any failure to match a time window of the at least one node. After further reassigning the infeasible nodes to the one or more clusters, when an estimated delivery time for at least one node of the nodes fails to match a time window of the at least one node, block 460 can increase the number of clusters, as well as the number of dispatched delivery vehicles, and can re-perform one or more of the procedures, the processes, and/or the activities of blocks 410-450 accordingly.

Method 400 optionally can include repeating one or more of the aforementioned procedures, the processes, and/or the activities in any of blocks 410-460, for a predetermined reiteration count, such as re-executing one or more of blocks 410-460 for 10, 20, 35, or 49, etc. more times. In some embodiments, method 400 also can stop the repeating before reaching the predetermined reiteration count when at least one of: (a) the infeasible order count is zero (e.g., all time window requirements are satisfied); (b) the infeasible order count is greater than a predetermined infeasible count threshold determined based on a total orders count from the order data (e.g., the time window requirements of more than 100, 150, or 300 nodes or 5 or 10 percent of the nodes cannot be satisfied); or (c) the one or more clusters remain unchanged after 2 consecutive repetitions of the one or more acts (e.g., it is unlikely that any improvement can happen in the following iteration(s)).

Furthermore, method 400 optionally can include a block of performing geo-manipulation of the coordinates for the nodes. For example, method 400 further can include stretching the node projections along a first axis of the coordinates before computing the node-cluster distance matrix. This stretching can be performed when a ratio between a distribution width of node projections for the nodes on the map along the first axis in a Cartesian coordinate system and a distribution width of the node projections along a second axis orthogonal to the first axis is less than a predetermined threshold distributed. In some embodiments, the Cartesian coordinate system can be the latitude-longitude geographic system. For example, for clustering nodes in a valley or on a peninsula that is substantially longer than wide (such as 50% larger from north to south than east to west), method 400 can stretch the coordinates of the nodes in the east-west direction (e.g., the longitude coordinate) so that the number of clusters determined by method 400 can be reduced, compared to the clusters determined without stretching. In a number of embodiments, the Cartesian coordinate system can be different from the latitude-longitude geographic system, such as tilting 30°, and method 400 further can include rotating the coordinate system and/or converting the coordinates of the nodes to align to the geographic coordinate system before stretching the coordinates along an axis.

In certain embodiments, method 400 optionally can include adjusting the predetermined parameters, such as the predetermined average load threshold, the predetermined reiteration count, the predetermined infeasible count threshold, and/or the predetermined threshold for determining whether stretching coordinates for the nodes is desired by a machine learning module(s). The feedback to the machine learning module(s) can be provided by a system administrator or automatically provided by a statistical tool configured to monitor the performance, such as the average time, mileage, and/or load per delivery vehicle, etc., of the delivery network (e.g., delivery network 300 (FIG. 3)).

Conventional approaches, such as the k-means algorithm, the mean-shift clustering algorithm, the density-based spatial clustering of applications with noise (DBSCAN), etc., are unable to handle the time window constraints and/or the load capacity constraint. In many embodiments, method 400, including reassigning the nodes in the clusters based on the load capacity constraint(s) in block 440 and further reassigning the nodes in the clusters based on the time constraint(s) in block 450, can advantageously address the problem by modifying the k-means algorithm and incorporating the procedure, process, or acts of reconsidering the delivery routes based on the load constraint(s) and/or the time constraint(s) and optionally reiterating the procedure, process, or acts of one or more of the aforementioned blocks to optimize the delivery routes as planned.

Figure 5:
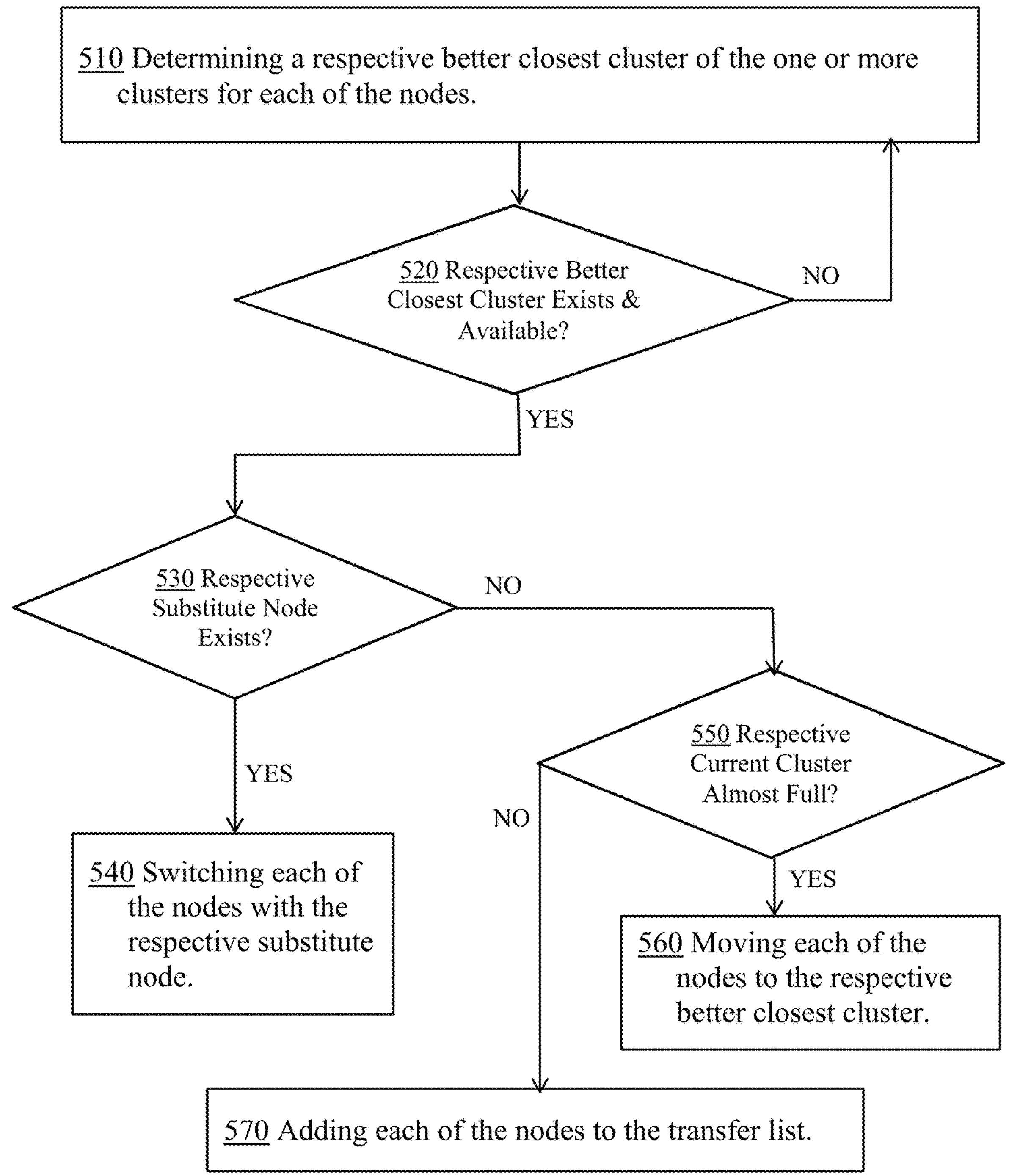
FIG. 5 illustrates a flow chart for a block of reassigning the delivery nodes to the clusters due to at least a load capacity constraint, according to the embodiment of FIG. 4.

Turning ahead in the drawings, FIG. 5 illustrates a flow chart for performing a portion of block 440 of reassigning the delivery nodes to the clusters due to at least a load capacity constraint, according to the embodiment of FIG. 4. Block 440 is merely exemplary and is not limited to the embodiments presented herein. Block 440 can be employed in many different embodiments or examples not specifically depicted or described herein. In some embodiments, the procedures, the processes, and/or the activities of block 440 can be performed in the order presented. In other embodiments, the procedures, the processes, and/or the activities of block 440 can be performed in any suitable order. In still other embodiments, one or more of the procedures, the processes, and/or the activities of block 440 can be combined or skipped.

In many embodiments, computer system 100 (FIG. 1) can be suitable to perform block 440 and/or one or more of the activities of block 440. In these or other embodiments, one or more of the activities of block 440 can be implemented as one or more computing instructions configured to run at one or more processors and configured to be stored at one or more non-transitory computer readable media. Such non-transitory computer readable media can be part of system 400 (FIG. 3). The processor(s) can be similar or identical to the processor(s) described above with respect to computer system 100 (FIG. 1).

In some embodiments, block 440 and other blocks or sub-blocks in block 440 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, block 440 can include a block 510 of determining a respective better closest cluster (e.g., the respective closest cluster that is not the respective current cluster) of the one or more clusters for each of the nodes. Block 510 can determine the better closest cluster for a node of the nodes when: (a) the distance between the node and the better closest cluster in the node-cluster-distance matrix is less than the distance between the node and each other cluster of the one or more clusters in the node-cluster-distance matrix; and (b) the better closest cluster is different from the current cluster of the node.

Block 440 further can include a block 520 of determining (a) whether the better closest cluster exists and (b) whether an associated delivery vehicle of the one or more dispatched delivery vehicles for the better closest cluster is able to accept the node in view of the load capacity of the associated delivery vehicle. When the answer to the question in block 530 is "no," block 440 can decide to do nothing with the node and proceed with the next node at block 510.

Block 440 also can include a block 530 of determining whether a respective substitute node for each of the node exists. Block 530 can be performed when the answer to the question in block 520 is "yes". Block 530 can determine that the respective substitute node for a node exists when at least one potential substitute node in a transfer list is currently assigned to the better closest cluster for the node. The transfer list can comprise one or more candidate nodes that can be switched with any other suitable nodes because the respective cluster for the one or more candidate nodes are not acceptable (see, block 570 below as an example). Block 530 further can determine that the substitute node for the subject node exists when switching the substitute node and the node can result in a negative combined node-cluster distance change (e.g., the sum of all of the node-cluster distances in the node-cluster distance matrix decreases after the potential substitute node and the node are switched).

Block 440 further can include a block 540 of switching each of the nodes with the respective substitute node, after block 530 determines that the respective substitute node for each of the nodes exists.

Block 440 additionally can include a block 550 of determining whether the current cluster for the node is almost full, according to the predetermined average load threshold (e.g., at least 65%, 70%, 80%, or 87% of the maximum load capacity is used). Block 550 can be performed when the answer to the question in block 530 is "no".

Furthermore, block 440 can include a block 560 of moving each of the nodes to the respective closest cluster, when (a) block 530 determines that no respective substitute node for each of the nodes exists; and (b) block 550 determines that the respective current cluster for each of the nodes has a respective used load capacity rate at least as great as the predetermined average load threshold.

Block 440 also can include a block 570 of adding each of the nodes to the transfer list, when (a) the respective substitute node does not exist, as determined in block 530; and (b) the respective used load capacity rate is less than the predetermined load threshold, as determined in block 550.

In some embodiments, block 440 optionally can include a block of (a) updating, in real-time, the respective centroid for each of the one or more clusters; and (b) re-computing, in real-time, the node-cluster distance matrix.

Figure 6:
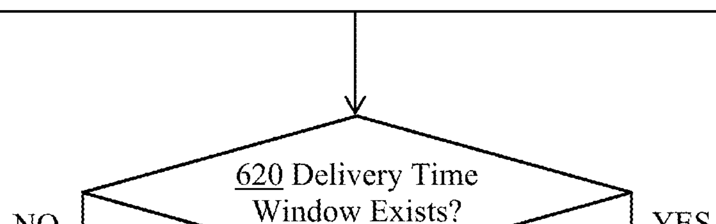
FIG. 6 illustrates a flow chart for a block of further reassigning the nodes to the clusters due to at least a time constraint, according to the embodiment of FIG. 4.

Turning ahead in the drawings, FIG. 6 illustrates a flow chart for performing a portion of block 450 of further reassigning the nodes to the clusters due to at least a time constraint, according to the embodiment of FIG. 4. Block 450 is merely exemplary and is not limited to the embodiments presented herein. Block 450 can be employed in many different embodiments or examples not specifically depicted or described herein. In some embodiments, the procedures, the processes, and/or the activities of block 450 can be performed in the order presented. In other embodiments, the procedures, the processes, and/or the activities of block 450 can be performed in any suitable order. In still other embodiments, one or more of the procedures, the processes, and/or the activities of block 450 can be combined or skipped.

Referring to FIG. 6, block 450 can include a block 610 of determining a respective delivery route for each of the one or more clusters for the nodes. In some embodiments, block 610 can determine the respective delivery route using one or more of suitable algorithms, such as a greedy algorithm, a multi-fragment algorithm, a nearest addition algorithm, Christofides' algorithm, and so forth.

Block 450 also can include a block 620 of determining whether a respective request for delivery in a respective time window exists for each of the nodes.

Block 450 similarly can include a block 630 of optimizing a respective first node delivery route for each of the one or more first nodes in each of the one or more clusters, when each of one or more first nodes of the nodes comprises a respective time window, as determined in block 620. In many embodiments, block 630 can optimize the respective first node delivery route for each of the one or more first nodes in each of the one or more clusters by applying a greedy algorithm, or any other suitable algorithm, to determine an optimal slot for the first node in the respective delivery route based, at least in part, on: (a) the respective time window for the respective first node; and (b) a respective node-node distance between each pair of cluster nodes in each of the one or more clusters.

Block 450 further can include a block 640 of optimizing a respective remaining node delivery route for each of one or more remaining nodes in each of the one or more clusters. Block 640 can be performed when the answer to the question in block 620 is "no". The one or more remaining nodes can comprise no time window specified for delivery. In many embodiments, block 640 can optimize the respective remaining node delivery route for each of the one or more remaining nodes in each of the one or more clusters by applying a greedy algorithm to determine a respective optimal slot for each of the one or more remaining nodes in the respective delivery route based, at least in part, on a respective node-node distance between each pair of cluster nodes in each of the one or more clusters.

In a number of embodiments, block 450 optionally can include a block of repeating, in real-time, the aforementioned one or more acts for further reassigning the nodes to the one or more clusters for a (second) predetermined reiteration count, such as re-executing one or more of blocks 410-460 (FIG. 4) for 6, 10, 20, or 100, etc. more times. Further, block 450 optionally can include a block of assigning, in real-time after each repetition of the one or more acts, a count of at least one of the one or more first nodes to an infeasible order count, when an estimated delivery time for the at least one of the one or more first nodes fails to match a time window of the at least one of the one or more first node.

Also, block 450 optionally can include a block of stopping repeating the one or more acts before reaching the (second) predetermined reiteration count, when at least one of: (a) the infeasible order count is zero; (b) the infeasible order count is greater than a (second) predetermined infeasible count threshold determined based on a total orders count from the order data; or (c) the one or more clusters remain unchanged after 2 consecutive repetitions of the one or more acts. In some embodiments, the (second) predetermined infeasible count can be identical to or different from the aforementioned predetermined infeasible count.

Figure 7:
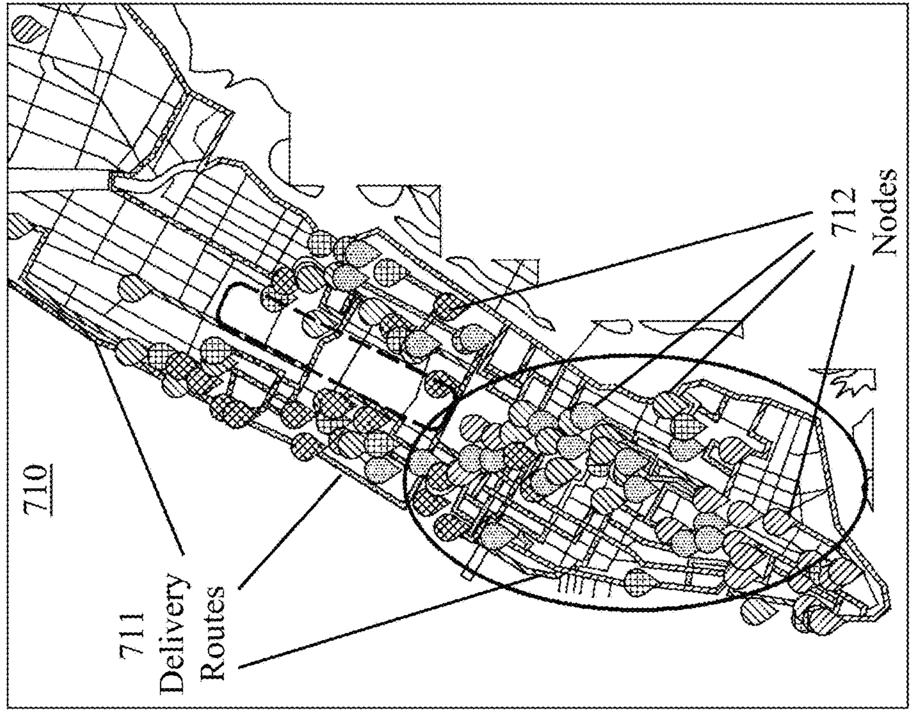
FIG. 7 illustrates an exemplary application for a method of optimizing deliver routes by clustering, according to the embodiment of FIG. 4.

Turning ahead in the drawings, FIG. 7 illustrates an application 700 for method 400 (FIG. 4) of optimizing deliver routes by clustering, according to the embodiment of FIG. 4. Application 700 in FIG. 7 is merely exemplary, and the method is not limited to the embodiments presented herein. In many embodiments, computer system 100 (FIG. 1) can be suitable to perform the method of optimizing deliver routes by clustering for application 700.

Referring to FIG. 7, application 700 includes 2 state blocks 710 and 720. Block 710 shows the initial state when some of the delivery routes 711 (for nodes 712) overlap with each other, indicating that some of the dispatched delivery vehicles travel in the same geographic area(s), which is undesirable. Block 720 shows an updated state after nodes 722 are grouped into different clusters (i.e., clusters 723) by method 400 (FIG. 4), in one example. For simplicity, the delivery routes are omitted from state block 720.

Figure 8:
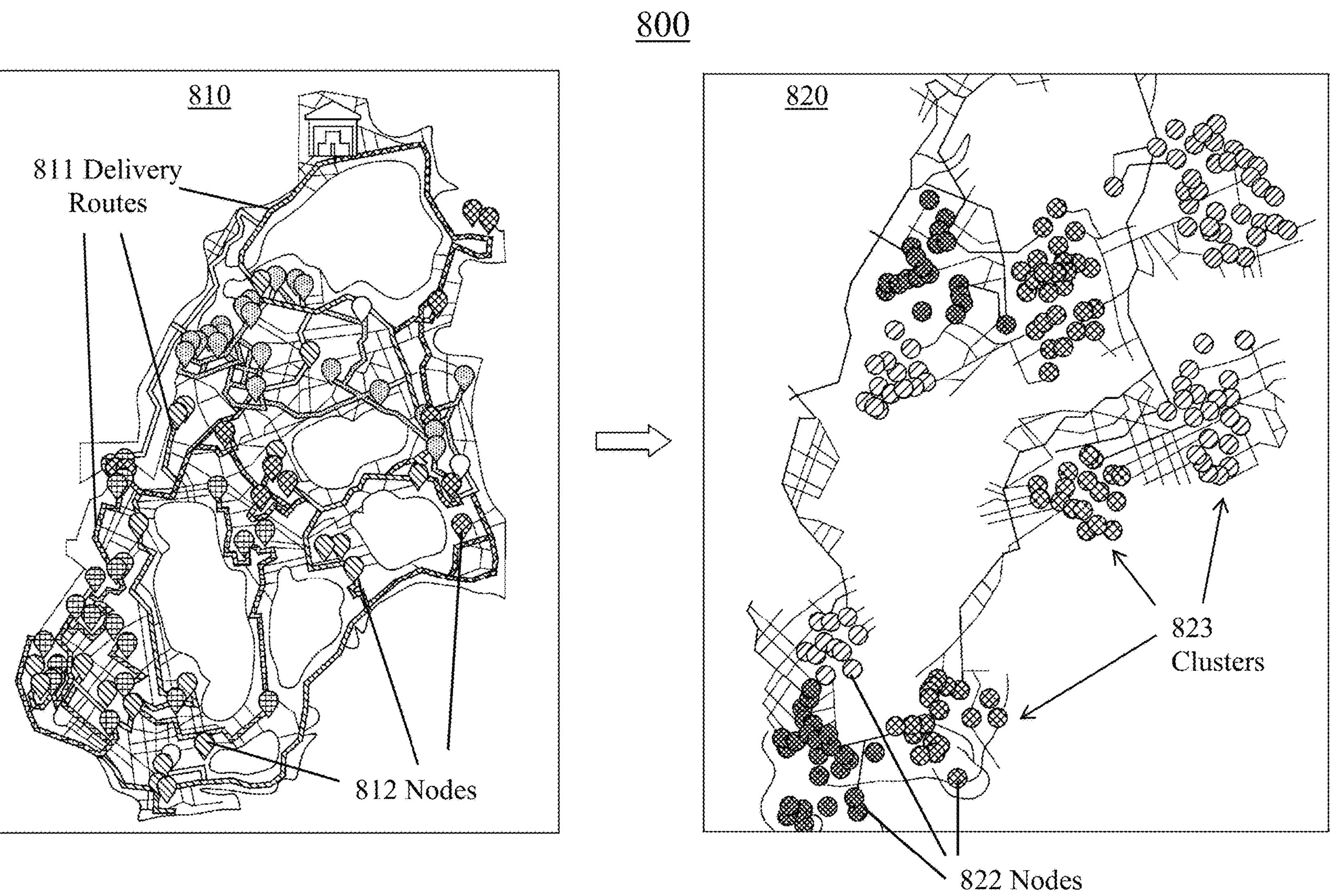
FIG. 8 illustrates another exemplary application for a method of optimizing deliver routes by clustering, according to the embodiment of FIG. 4.

Turning ahead in the drawings, FIG. 8 illustrates another application 800 for method 400 (FIG. 4) of optimizing deliver routes by clustering, according to the embodiment of FIG. 4. Application 800 in FIG. 8 is merely exemplary, and the method is not limited to the embodiments presented herein. In many embodiments, computer system 100 (FIG. 1) can be suitable to perform the method of optimizing deliver routes by clustering for application 800.

Referring to FIG. 8, application 800 includes 2 state blocks 810 and 820. Block 810 shows the initial state when some of the delivery routes 811 (for un-clustered nodes 812) overlap with each other, which is undesirable. Block 820 shows an updates state after nodes 822 are grouped into different clusters (i.e., clusters 823) by method 400 (FIG. 4), in one example. For simplicity, the delivery routes are omitted from state block 820.

Figure 9:
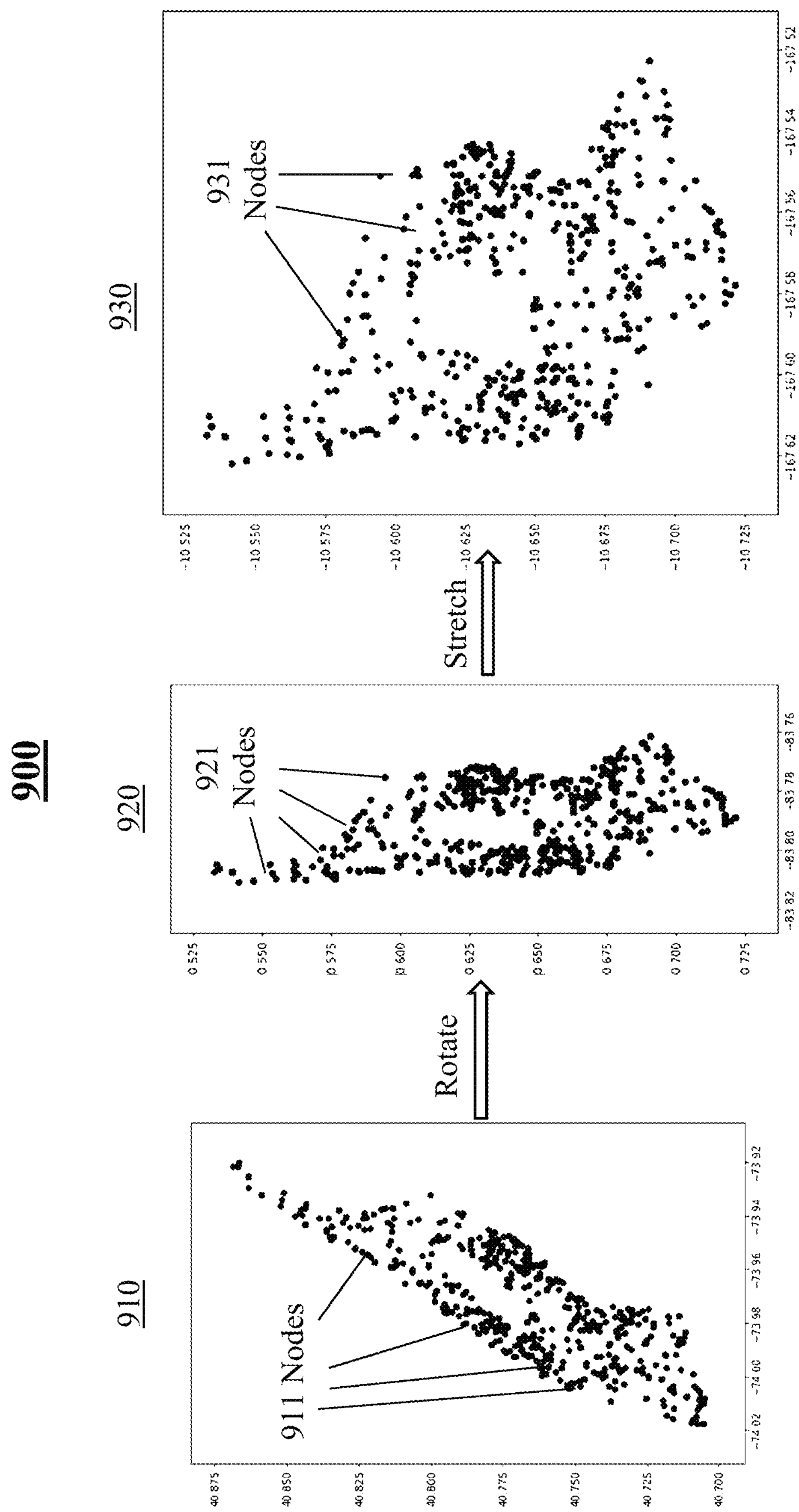
FIG. 9 illustrates another exemplary application for geo-manipulation in a method of optimizing deliver routes by clustering, according to the embodiment of FIG. 4.

Turning ahead in the drawings, FIG. 9 illustrates another application 900 for geo-manipulation in method 400 (FIG. 4) of optimizing deliver routes by clustering, according to the embodiment of FIG. 4. Application 900 in FIG. 9 is merely exemplary, and the method is not limited to the embodiments presented herein. In many embodiments, computer system 100 (FIG. 1) can be suitable to perform the method of optimizing deliver routes by clustering for application 900.

Referring to FIG. 9, application 900 includes 3 state blocks 910, 920, and 930. Block 910 shows the initial state when nodes 911 shown on a geographic coordinate system are distributed in a tilted, relatively elongated area. Block 920 shows an intermediate state when the area for the nodes 911 are rotated to be substantially aligned with the geographic coordinate system to create nodes 921. As shown in block 920, the distribution width of the nodes 921 along the x, horizontal, or latitudinal axis is much less than the distribution width of the nodes 921 along the y, vertical, or longitudinal axis. Method 400 (FIG. 4) can have a predetermined threshold of 50% and can automatically, or pursuant to a user request by an administrator, stretch the coordinates of the nodes 921 along the x axis. Accordingly, block 930 shows a final state of nodes 931 after the coordinates of nodes 921 are stretched along the x axis.

In many embodiments, the techniques described herein can provide a practical application and several technological improvements. In some embodiments, the techniques described herein can provide for automatically optimizing delivery routes by clustering the nodes for delivery destinations while taking into consideration the various constraints of the delivery network including the origin, the delivery vehicles, and/or the nodes. These techniques described herein can provide a significant improvement over conventional approaches of assuming that all nodes are equal.

In many embodiments, the techniques described herein can be used continuously at a scale that cannot be handled using manual techniques. For example, the number of nodes for orders to be delivered can be over 1000, 3000, or 5000 per day, and the delivery routes, as well as loads, for delivery vehicles that comply with all the constraints in time and/or load capacity can be generated in less than 10-30 minutes, or any time period between a delivery cutoff time and a time for the preparation of the next pickup time.

In a number of embodiments, the techniques described herein can solve a technical problem that arises only within the realm of computer networks, as online ordering do not exist outside the realm of computer networks. Moreover, the techniques described herein can solve a technical problem that cannot be solved outside the context of computer networks. Specifically, the techniques described herein cannot be used outside the context of computer networks, in view of a lack of data.

Various embodiments can include a system including one or more processors and one or more non-transitory computer-readable media storing computing instructions configured to run on the one more processors and perform certain acts. The acts can include extracting (a) location information of nodes from order data, (b) time window information of the nodes from the order data, and (c) load capacity information of delivery vehicles The acts further can include generating, in real-time, one or more clusters for the nodes based, at least in part, on (a) the location information of the nodes and (b) the load capacity information. Each of the one or more clusters can be associated with a respective vehicle of one or more dispatched vehicles of the delivery vehicles.

The acts also can include determining, in real-time, a respective centroid for each of the one or more clusters based on location information of cluster nodes of the nodes for each of the one or more clusters. Further, the acts can include computing, in real-time, a node-cluster distance matrix. The node-cluster distance matrix can comprise a respective node-cluster distance between each of the nodes and each of the one or more clusters based, at least in part, on a respective distance between each of the nodes and the respective centroid for each of the one or more clusters.

Additionally, the acts can include reassigning, in real-time, the nodes to the one or more clusters based, at least in part, on: (a) the node-cluster distance matrix; (b) load capacity information of the one or more dispatched vehicles; and (c) a predetermined average load threshold of the one or more dispatched vehicles. Moreover, the acts can include further reassigning, in real-time in at least 2 passes, the nodes to the one or more clusters based, at least in part, on the time window information of the nodes.

A number of embodiments can include a method being implemented via execution of computing instructions configured to run at one or more processors and stored at one or more non-transitory computer-readable media. The method can include extracting (a) location information of nodes from order data, (b) time window information of the nodes from the order data, and (c) load capacity information of delivery vehicles The method further can include generating, in real-time, one or more clusters for the nodes based, at least in part, on (a) the location information of the nodes and (b) the load capacity information. Each of the one or more clusters can be associated with a respective vehicle of one or more dispatched vehicles of the delivery vehicles.

The method also can include determining, in real-time, a respective centroid for each of the one or more clusters based on location information of cluster nodes of the nodes for each of the one or more clusters. Further, the method can include computing, in real-time, a node-cluster distance matrix. The node-cluster distance matrix can comprise a respective node-cluster distance between each of the nodes and each of the one or more clusters based, at least in part, on a respective distance between each of the nodes and the respective centroid for each of the one or more clusters.

Additionally, the method can include reassigning, in real-time, the nodes to the one or more clusters based, at least in part, on: (a) the node-cluster distance matrix; (b) load capacity information of the one or more dispatched vehicles; and (c) a predetermined average load threshold of the one or more dispatched vehicles. Moreover, the method can include further reassigning, in real-time in at least 2 passes, the nodes to the one or more clusters based, at least in part, on the time window information of the nodes.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although providing automatically planning delivery routes by clustering has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 4-6 may include different procedures, processes, and/or activities and be performed by many different modules, in many different orders. As another example, one or more of the procedures, processes, and/or activities of one of FIGS. 4-6 can be performed in another one of FIGS. 4-6.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions configured to, when run on the one or more processors, cause the one or more processors to perform:

generating training data for a machine learning module based on historical load thresholds and historical delivery performance data of delivery vehicles;

training the machine learning module based on the training data to determine a load threshold for to-be-dispatched delivery vehicles;

extracting (a) location information of nodes from order data, (b) time window information of the nodes from the order data, and (c) load capacity information of the delivery vehicles;

generating, in real-time, one or more clusters for the nodes based, at least in part, on (a) the location information of the nodes and (b) the load capacity information, wherein:

each of the one or more clusters is associated with a respective vehicle of one or more dispatched vehicles of the delivery vehicles;

determining, in real-time, a respective centroid for each of the one or more clusters based on location information of cluster nodes of the nodes for each of the one or more clusters;

computing, in real-time, a node-cluster distance matrix, wherein the node-cluster distance matrix comprises a respective node-cluster distance between each of the nodes and each of the one or more clusters based, at least in part, on a respective distance between each of the nodes and the respective centroid for each of the one or more clusters;

determining, by the machine learning module, an average load threshold of the one or more dispatch vehicles;

reassigning, in real-time, the nodes to the one or more clusters based, at least in part, on:

the node-cluster distance matrix, as computed;

the load capacity information, as extracted, of the one or more dispatched vehicles; and the average load threshold, as determined;

further reassigning, in real-time in at least 2 passes, the nodes to the one or more clusters based, at least in part, on the time window information of the nodes, wherein:

the nodes comprise one or more first nodes and one or more remaining nodes;

each of the one or more first nodes of the nodes is associated with a respective time window request;

none of the one or more remaining nodes is associated with any time window request; and further reassigning, in real-time in the at least 2 passes, the nodes to the one or more clusters further comprises:

determining a respective delivery route for each of the one or more clusters for the nodes; and prioritizing the one or more first nodes of the nodes over the one or more remaining nodes of the nodes by:

in at least a first pass of the at least 2 passes, re-determining the respective delivery route for each of the one or more first nodes, but not the one or more remaining nodes, in each of the one or more clusters based on the respective time window request; and in at least a second pass of the at least 2 passes after the first pass, re-determining the respective delivery route for each of the one or more remaining nodes in each of the one or more clusters;

transmitting the respective delivery route, as determined and re-determined, to be displayed on a respective user device for a respective driver for the respective vehicle; and after transmitting the respective delivery route:

monitoring respective performance data of the respective vehicle;

updating the training data based on the average load threshold, as determined, and the respective performance data, as monitored; and re-training the machine learning module based on the training data, as updated.

2. The system in claim 1, wherein:

the computing instructions are further configured to, when run on the one or more processors, cause the one or more processors to perform:

when an estimated delivery time for at least one node of the nodes, after further reassigning the nodes to the one or more clusters, fails to match a time window of the at least one node:

adding a new cluster to the one or more clusters; and re-generating, in real-time, the one or more clusters for the nodes.

3. The system in claim 1, wherein:

reassigning the nodes to the one or more clusters further comprises:

determining a closest cluster of the one or more clusters for each of the nodes, wherein:

a distance between each of the nodes and the closest cluster in the node-cluster distance matrix is less than a respective node-cluster distance between each of the nodes and each other cluster of the one or more clusters in the node-cluster distance matrix; and the closest cluster is different from a respective current cluster of the one or more clusters for each of the nodes; and when (a) the closest cluster exists; and (b) the closest cluster has an available load capacity for each of the nodes:

when a substitute node exists in both the closest cluster and a transfer list, switching each of the nodes with the substitute node;

when (a) the substitute node does not exist; and (b) the respective current cluster for each of the nodes has a respective used load capacity rate at least as great as the average load threshold, moving each of the nodes to the closest cluster; and when (a) the substitute node does not exist; and (b) the respective used load capacity rate is less than the average load threshold: adding each of the nodes to the transfer list.

4. The system in claim 3, wherein:

the computing instructions are further configured to, when run on the one or more processors, cause the one or more processors to perform:

determining, in real-time after determining the closest cluster for each of the nodes, that the substitute node, for each of the nodes from both the closest cluster and the transfer list, exists, when switching the substitute node and each of the nodes between results in a negative combined node-cluster distance change.

5. The system in claim 3, wherein:

reassigning the nodes to the one or more clusters further comprises:

updating, in real-time, the respective centroid for each of the one or more clusters; and re-computing, in real-time, the node-cluster distance matrix.

6. The system in claim 1, wherein:

determining the respective delivery route for each of the one or more clusters is further based at least in part on a respective time constraint for the respective delivery route as to one or more of: a respective delivery origin, the respective vehicle, or the respective driver for the respective delivery route.

7. The system in claim 1, wherein:

at least one of:

re-determining the respective delivery route for each of the one or more first nodes, but not the one or more remaining nodes, in each of the one or more clusters in at least the first pass further comprises applying a greedy algorithm to determine an optimal slot for the each of the one or more first nodes in the respective delivery route based, at least in part, on:

the respective time window request for the each of the one or more first nodes; and a respective node-node distance between each pair of cluster nodes in each of the one or more clusters; or re-determining the respective delivery route for each of the one or more remaining nodes in each of the one or more clusters in at least the second pass further comprises applying a greedy algorithm to determine a respective optimal slot for the each of the one or more remaining nodes in the respective delivery route based, at least in part, on:

a respective node-node distance between each pair of cluster nodes in each of the one or more clusters.

8. The system in claim 1, wherein:

further reassigning, in real-time in the at least 2 passes, the nodes to the one or more clusters further comprises:

repeating one or more acts for further reassigning, in real-time in the at least 2 passes, the nodes to the one or more clusters for a predetermined reiteration count;

assigning, in real-time after each repetition of the one or more acts, a count of at least one of the one or more first nodes to an infeasible order count, when an estimated delivery time for the at least one of the one or more first nodes fails to match a time window of the at least one of the one or more first nodes; and stopping repeating the one or more acts before reaching the predetermined reiteration count, when at least one of:

the infeasible order count is zero;

the infeasible order count is greater than a predetermined infeasible count threshold determined based on a total orders count from the order data; or the one or more clusters remain unchanged after 2 consecutive repetitions of the one or more acts.

9. The system in claim 1, wherein:

computing, in real-time, the node-cluster distance matrix further comprises one or more of:

determining the respective node-cluster distance between each of the nodes and each of the one or more clusters based on a street distance on a map; or when a ratio between a distribution width of node projections for the nodes on the map along a first axis in a Cartesian coordinate system and a distribution width of the node projections along a second axis orthogonal to the first axis is less than a predetermined threshold distributed, stretching the node projections along the first axis before computing the node-cluster distance matrix.

10. The system in claim 1, wherein:

generating the one or more clusters for the nodes further comprises:

when (a) at least two nodes of the nodes have identical destinations; and (b) at least one of: (i) a respective cluster for each of the at least two nodes is different; or (ii) a respective slot for each of the at least two nodes in an identical delivery route is different from each other, merging the at least two nodes.

11. A method being implemented via execution of computing instructions configured to run at one or more processors and stored at one or more non-transitory computer-readable media, the method comprising:

generating training data for a machine learning module based on historical load thresholds and historical delivery performance data of delivery vehicles;

training the machine learning module based on the training data to determine a load threshold for to-be-dispatched delivery vehicles;

extracting (a) location information of nodes from order data, (b) time window information of the nodes from the order data, and (c) load capacity information of the delivery vehicles;

generating, in real-time, one or more clusters for the nodes based, at least in part, on (a) the location information of the nodes and (b) the load capacity information, wherein:

each of the one or more clusters is associated with a respective vehicle of one or more dispatched vehicles of the delivery vehicles;

determining, in real-time, a respective centroid for each of the one or more clusters based on location information of cluster nodes of the nodes for each of the one or more clusters;

computing, in real-time, a node-cluster distance matrix, wherein the node-cluster distance matrix comprises a respective node-cluster distance between each of the nodes and each of the one or more clusters based, at least in part, on a respective distance between each of the nodes and the respective centroid for each of the one or more clusters;

determining, by the machine learning module, an average load threshold of the one or more dispatch vehicles;

reassigning, in real-time, the nodes to the one or more clusters based, at least in part, on:

the node-cluster distance matrix, as computed;

the load capacity information, as extracted, of the one or more dispatched vehicles; and the average load threshold, as determined;

further reassigning, in real-time in at least 2 passes, the nodes to the one or more clusters based, at least in part, on the time window information of the nodes, wherein:

the nodes comprise one or more first nodes and one or more remaining nodes;

each of the one or more first nodes of the nodes is associated with a respective time window request;

none of the one or more remaining nodes is associated with any time window request; and further reassigning, in real-time in the at least 2 passes, the nodes to the one or more clusters further comprises:

determining a respective delivery route for each of the one or more clusters for the nodes; and prioritizing the one or more first nodes of the nodes over the one or more remaining nodes of the nodes by:

in at least a first pass of the at least 2 passes, re-determining the respective delivery route for each of the one or more first nodes, but not the one or more remaining nodes, in each of the one or more clusters based on the respective time window request; and in at least a second pass of the at least 2 passes after the first pass, re-determining the respective delivery route for each of the one or more remaining nodes in each of the one or more clusters;

transmitting the respective delivery route, as determined and re-determined, to be displayed on a respective user device for a respective driver for the respective vehicle; and after transmitting the respective delivery route:

monitoring respective performance data of the respective vehicle;

updating the training data based on the average load threshold, as determined, and the respective performance data, as monitored; and re-training the machine learning module based on the training data, as updated.

12. The method in claim 11 further comprising:

delivery time for at least one node of the nodes, after further reassigning the nodes to the one or more clusters, fails to match a time window of the at least one node:

adding a new cluster to the one or more clusters; and re-generating, in real-time, the one or more clusters for the nodes.

13. The method in claim 11, wherein:

reassigning the nodes to the one or more clusters further comprises:

determining a closest cluster of the one or more clusters for each of the nodes, wherein:

a distance between each of the nodes and the closest cluster in the node-cluster distance matrix is less than a respective node-cluster distance between each of the nodes and each other cluster of the one or more clusters in the node-cluster distance matrix; and the closest cluster is different from a respective current cluster of the one or more clusters for each of the nodes; and when (a) the closest cluster exists; and (b) the closest cluster has an available load capacity for each of the nodes:

when a substitute node exists in both the closest cluster and a transfer list, switching each of the nodes with the substitute node;

when (a) the substitute node does not exist; and (b) the respective current cluster for each of the nodes has a respective used load capacity rate at least as great as the average load threshold, moving each of the nodes to the closest cluster; and when (a) the substitute node does not exist; and (b) the respective used load capacity rate is less than the average load threshold: adding each of the nodes to the transfer list.

14. The method in claim 13 further comprising:

determining, in real-time after determining the closest cluster for each of the nodes, that the substitute node, for each of the nodes from both the closest cluster and the transfer list, exists, when switching the substitute node and each of the nodes between results in a negative combined node-cluster distance change.

15. The method in claim 13, wherein:

reassigning the nodes to the one or more clusters further comprises:

updating, in real-time, the respective centroid for each of the one or more clusters; and re-computing, in real-time, the node-cluster distance matrix.

16. The method in claim 11, wherein:

determining the respective delivery route for each of the one or more clusters is further based at least in part on a respective time constraint for the respective delivery route as to one or more of: a respective delivery origin, the respective vehicle, or the respective driver for the respective delivery route.

17. The method in claim 11, wherein:

at least one of:

re-determining the respective delivery route for each of the one or more first nodes, but not the one or more remaining nodes, in each of the one or more clusters in at least the first pass further comprises applying a greedy algorithm to determine an optimal slot for the each of the one or more first nodes in the respective delivery route based, at least in part, on:

the respective time window request for the each of the one or more first nodes; and a respective node-node distance between each pair of cluster nodes in each of the one or more clusters; or re-determining the respective delivery route for each of the one or more remaining nodes in each of the one or more clusters in at least the second pass further comprises applying a greedy algorithm to determine a respective optimal slot for the each of the one or more remaining nodes in the respective delivery route based, at least in part, on:

a respective node-node distance between each pair of cluster nodes in each of the one or more clusters.

18. The method in claim 11, wherein:

further reassigning, in real-time in the at least 2 passes, the nodes to the one or more clusters further comprises:

repeating one or more acts for further reassigning, in real-time in the at least 2 passes, the nodes to the one or more clusters for a predetermined reiteration count;

assigning, in real-time after each repetition of the one or more acts, a count of at least one of the one or more first nodes to an infeasible order count, when an estimated delivery time for the at least one of the one or more first nodes fails to match a time window of the at least one of the one or more first nodes; and stopping repeating the one or more acts before reaching the predetermined reiteration count, when at least one of:

the infeasible order count is zero;

the infeasible order count is greater than a predetermined infeasible count threshold determined based on a total orders count from the order data; or the one or more clusters remain unchanged after 2 consecutive repetitions of the one or more acts.

19. The method in claim 11, wherein:

computing, in real-time, the node-cluster distance matrix further comprises one or more of:

determining the respective node-cluster distance between each of the nodes and each of the one or more clusters based on a street distance on a map; or when a ratio between a distribution width of node projections for the nodes on the map along a first axis in a Cartesian coordinate system and a distribution width of the node projections along a second axis orthogonal to the first axis is less than a predetermined threshold distributed, stretching the node projections along the first axis before computing the node-cluster distance matrix.

20. The method in claim 11 wherein:

generating the one or more clusters for the nodes further comprises:

when (a) at least two nodes of the nodes have identical destinations; and (b) at least one of: (i) a respective cluster for each of the at least two nodes is different; or (ii) a respective slot for each of the at least two nodes in an identical delivery route is different from each other, merging the at least two nodes.

* * * * *